United States Patent
Eperiesi-Beck

(10) Patent No.: US 10,241,930 B2
(45) Date of Patent: *Mar. 26, 2019

(54) STORING DATA IN A SERVER COMPUTER WITH DEPLOYABLE ENCRYPTION/DECRYPTION INFRASTRUCTURE

(71) Applicant: eperi GmbH, Pfungstadt (DE)

(72) Inventor: Elmar Eperiesi-Beck, Darmstadt (DE)

(73) Assignee: eperi GmbH, Pfungstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/933,078

(22) Filed: Mar. 22, 2018

(65) Prior Publication Data

US 2018/0217944 A1  Aug. 2, 2018

Related U.S. Application Data

(63) Continuation of application No. 14/959,555, filed on Dec. 4, 2015, now Pat. No. 9,959,217.

(30) Foreign Application Priority Data

Dec. 8, 2014 (EP) .................... 14196711

(51) Int. Cl.
- *H04L 29/06* (2006.01)
- *G06F 12/14* (2006.01)
- *G06F 21/62* (2013.01)

(52) U.S. Cl.
CPC .......... *G06F 12/1408* (2013.01); *G06F 21/62* (2013.01); *H04L 63/061* (2013.01); *H04L 63/0876* (2013.01); *G06F 2212/1052* (2013.01)

(58) Field of Classification Search
CPC ............... G06F 12/1408; G06F 21/62; G06F 2212/1052; H04L 63/0876; H04L 63/061
See application file for complete search history.

(56) References Cited

U.S. PATENT DOCUMENTS

| | | | |
|---|---|---|---|
| 4,168,396 A | 9/1979 | Best et al. | |
| 4,278,837 A | 7/1981 | Best | |
| 7,093,137 B1 | 8/2006 | Sato et al. | |

(Continued)

FOREIGN PATENT DOCUMENTS

| | | |
|---|---|---|
| CN | 101639882 A | 2/2010 |
| JP | 2012134714 A | 7/2012 |

OTHER PUBLICATIONS

Bouganim, et al., "Database Encryption", Encyclopedia of Cryptography and Security, 2011, 10 pages.

(Continued)

*Primary Examiner* — David Garcia Cervetti
(74) *Attorney, Agent, or Firm* — Brake Hughes Bellermann LLP

(57) ABSTRACT

For storing data in a data-storage structure of a server computer, an infrastructure is deployed to a server computer. The infrastructure has a forwarder module to receive data from an application and to identify a data portion, a crypto module to encrypt the data portion with a key and key control module adapted to generate and to store the key. The infrastructure is also able to process data in the opposite direction. The key is provided into the key control module upon receiving a key trigger from the client computer.

20 Claims, 8 Drawing Sheets

(56) References Cited

U.S. PATENT DOCUMENTS

| | | | |
|---|---|---|---|
| 7,639,819 B2 | 12/2009 | Ho et al. | |
| 7,729,496 B2 | 6/2010 | Hacigumus et al. | |
| 7,743,069 B2 | 6/2010 | Chitkara et al. | |
| 7,865,440 B2 | 1/2011 | Jaquette et al. | |
| 7,904,732 B2 | 3/2011 | Cui et al. | |
| 8,042,155 B1 | 10/2011 | Chang et al. | |
| 8,321,921 B1* | 11/2012 | Ahmed | G06F 21/00 726/5 |
| 8,347,355 B2* | 1/2013 | Mower | H04L 67/025 726/3 |
| 8,656,482 B1* | 2/2014 | Tosa | H04L 63/08 713/153 |
| 9,021,259 B2 | 4/2015 | Furukawa | |
| 9,031,229 B1* | 5/2015 | Nita | H04L 9/008 380/28 |
| 9,294,282 B1* | 3/2016 | Potlapally | H04L 9/3236 |
| 9,306,946 B1* | 4/2016 | Osburn | H04L 63/0428 |
| 9,342,705 B1 | 5/2016 | Schneider et al. | |
| 9,369,443 B1* | 6/2016 | Sinor | H04L 63/045 |
| 9,442,752 B1* | 9/2016 | Roth | G06F 9/45558 |
| 9,584,517 B1* | 2/2017 | Roth | H04L 63/10 |
| 9,727,491 B2* | 8/2017 | Amarendran | G06F 21/6218 |
| 9,825,925 B2* | 11/2017 | Hore | H04L 63/06 |
| 9,836,308 B2* | 12/2017 | Boenisch | G06F 9/4408 |
| 9,860,219 B2* | 1/2018 | Geagan, III | H04L 63/0428 |
| 9,922,207 B2* | 3/2018 | Kopasz | G06F 21/6245 |
| 9,959,414 B1* | 5/2018 | Leventhal | H04L 9/0637 |
| 9,965,645 B2* | 5/2018 | Sinor | H04L 63/045 |
| 2002/0162104 A1 | 10/2002 | Raike et al. | |
| 2002/0194470 A1* | 12/2002 | Grupe | H04L 63/0428 713/153 |
| 2003/0046572 A1 | 3/2003 | Newman et al. | |
| 2004/0015819 A1* | 1/2004 | Romano-Critchley | G06F 8/20 717/102 |
| 2004/0059912 A1 | 3/2004 | Zizzi et al. | |
| 2004/0091114 A1 | 5/2004 | Carter et al. | |
| 2004/0153642 A1 | 8/2004 | Plotkin et al. | |
| 2004/0230792 A1 | 11/2004 | McCarty et al. | |
| 2005/0132070 A1 | 6/2005 | Redlich et al. | |
| 2005/0138109 A1 | 6/2005 | Redlich et al. | |
| 2006/0184793 A1 | 8/2006 | Zizzi et al. | |
| 2006/0212939 A1* | 9/2006 | England | G06F 21/57 726/22 |
| 2006/0277413 A1 | 12/2006 | Drews et al. | |
| 2007/0110236 A1* | 5/2007 | Tada | H04N 5/913 380/201 |
| 2007/0180228 A1 | 8/2007 | Mattsson et al. | |
| 2007/0239995 A1* | 10/2007 | Tucker | G01R 31/31719 713/189 |
| 2007/0253549 A1 | 11/2007 | Celikkan et al. | |
| 2008/0025508 A1* | 1/2008 | Lee | H04N 5/913 380/201 |
| 2008/0133919 A1* | 6/2008 | You | H04L 9/0844 713/175 |
| 2008/0165957 A1* | 7/2008 | Kandasamy | G06F 21/6218 380/44 |
| 2008/0240434 A1* | 10/2008 | Kitamura | G06F 21/80 380/255 |
| 2008/0263355 A1 | 10/2008 | Witt et al. | |
| 2009/0204964 A1* | 8/2009 | Foley | G06F 21/53 718/1 |
| 2009/0285396 A1 | 11/2009 | Wong et al. | |
| 2010/0106977 A1* | 4/2010 | Persson | G06F 21/54 713/189 |
| 2010/0250497 A1* | 9/2010 | Redlich | F41H 13/00 707/661 |
| 2010/0328064 A1* | 12/2010 | Rogel | G06F 21/56 340/540 |
| 2010/0330953 A1* | 12/2010 | Rogel | G06F 9/45537 455/405 |
| 2010/0330961 A1* | 12/2010 | Rogel | G06F 21/31 455/411 |
| 2010/0332479 A1* | 12/2010 | Prahlad | G06F 17/30082 707/741 |
| 2010/0332635 A1* | 12/2010 | Rogel | G06F 9/45533 709/223 |
| 2010/0333088 A1* | 12/2010 | Rogel | G06F 9/45533 718/1 |
| 2011/0022851 A1* | 1/2011 | Yokota | H04L 9/0894 713/189 |
| 2011/0154031 A1 | 6/2011 | Banerjee et al. | |
| 2011/0246785 A1* | 10/2011 | Linsley | G06F 21/53 713/189 |
| 2011/0264907 A1* | 10/2011 | Betz | H04L 63/0428 713/153 |
| 2011/0271096 A1 | 11/2011 | Bharrat et al. | |
| 2011/0296197 A1* | 12/2011 | Konetski | G06F 21/53 713/189 |
| 2012/0017095 A1* | 1/2012 | Blenkhorn | G06F 21/602 713/189 |
| 2012/0110328 A1* | 5/2012 | Pate | G06F 21/6218 713/165 |
| 2012/0185913 A1* | 7/2012 | Martinez | G06F 9/455 726/1 |
| 2012/0290647 A1* | 11/2012 | Ellison | H04L 41/0233 709/203 |
| 2012/0297201 A1 | 11/2012 | Matsuda et al. | |
| 2013/0042106 A1 | 2/2013 | Persaud et al. | |
| 2013/0111217 A1* | 5/2013 | Kopasz | G06F 21/6245 713/189 |
| 2013/0268357 A1* | 10/2013 | Heath | H04L 63/00 705/14.53 |
| 2013/0305039 A1 | 11/2013 | Gauda et al. | |
| 2013/0318347 A1* | 11/2013 | Moffat | H04L 63/08 713/168 |
| 2013/0339722 A1* | 12/2013 | Krendelev | H04L 9/008 713/150 |
| 2014/0013112 A1* | 1/2014 | Cidon | G06F 21/6218 713/165 |
| 2014/0019745 A1* | 1/2014 | Dodgson | H04L 63/065 713/150 |
| 2014/0020072 A1* | 1/2014 | Thomas | H04L 63/0815 726/7 |
| 2014/0089658 A1* | 3/2014 | Raghurann | H04L 9/0825 713/155 |
| 2014/0089674 A1* | 3/2014 | Buehl | G06F 12/14 713/189 |
| 2014/0122866 A1* | 5/2014 | Haeger | H04L 63/061 713/153 |
| 2014/0122873 A1* | 5/2014 | Deutsch | H04L 63/20 713/158 |
| 2014/0157004 A1* | 6/2014 | Park | G06F 9/45533 713/189 |
| 2014/0164776 A1 | 6/2014 | Hook et al. | |
| 2014/0173272 A1* | 6/2014 | Kim | G06F 21/6218 713/153 |
| 2014/0195798 A1* | 7/2014 | Brugger | H04L 63/0227 713/154 |
| 2014/0208123 A1* | 7/2014 | Roth | G06F 21/72 713/189 |
| 2014/0237255 A1 | 8/2014 | Martin et al. | |
| 2014/0250491 A1* | 9/2014 | Fleischman | H04L 63/20 726/1 |
| 2014/0258716 A1* | 9/2014 | MacMillan | G06F 21/53 713/164 |
| 2014/0258719 A1* | 9/2014 | Cidon | G06F 21/62 713/165 |
| 2014/0281477 A1* | 9/2014 | Nayshtut | H04L 9/0825 713/150 |
| 2014/0281514 A1* | 9/2014 | Erofeev | G06F 21/6218 713/165 |
| 2015/0007175 A1* | 1/2015 | Potlapally | G06F 21/57 718/1 |
| 2015/0033032 A1 | 1/2015 | Furukawa | |
| 2015/0039903 A1 | 2/2015 | Rosu et al. | |
| 2015/0058629 A1* | 2/2015 | Yarvis | H04L 63/061 713/171 |
| 2015/0095664 A1 | 4/2015 | Furukawa | |

(56) References Cited

U.S. PATENT DOCUMENTS

| | | | |
|---|---|---|---|
| 2015/0113142 A1* | 4/2015 | Adolph | H04L 47/70 709/226 |
| 2015/0143112 A1 | 5/2015 | Yavuz et al. | |
| 2015/0186657 A1* | 7/2015 | Nakhjiri | H04L 63/06 713/155 |
| 2015/0281185 A1* | 10/2015 | Cooley | H04L 63/0428 713/171 |
| 2015/0281189 A1* | 10/2015 | Nayshtut | H04L 63/045 713/168 |
| 2015/0324592 A1 | 11/2015 | Dutta | |
| 2015/0348050 A1* | 12/2015 | Erhart | G06Q 50/01 705/304 |
| 2015/0358311 A1* | 12/2015 | Kancharla | G06F 21/335 713/156 |
| 2015/0365382 A1* | 12/2015 | Balakrishnan | H04L 63/0428 713/168 |
| 2015/0371052 A1* | 12/2015 | Lepeshenkov | H04L 63/06 713/165 |
| 2015/0381362 A1* | 12/2015 | Thota | G09C 1/00 713/189 |
| 2016/0014131 A1* | 1/2016 | Neafsey | H04L 63/061 713/171 |
| 2016/0028698 A1 | 1/2016 | Antipa et al. | |
| 2016/0078245 A1* | 3/2016 | Amarendran | G06F 21/6218 713/193 |
| 2016/0117521 A1 | 4/2016 | Lenhardt et al. | |
| 2016/0119293 A1* | 4/2016 | Leon | H04L 9/14 713/168 |
| 2016/0140343 A1* | 5/2016 | Novak | G06F 21/575 713/2 |
| 2016/0149877 A1* | 5/2016 | Kancharla | H04L 63/062 713/171 |
| 2016/0162417 A1 | 6/2016 | Eperiesi-Beck | |
| 2016/0171248 A1* | 6/2016 | Nesher | G06F 21/53 713/190 |
| 2016/0344724 A1* | 11/2016 | Shoshan | H04L 63/0428 |
| 2016/0350535 A1* | 12/2016 | Garcia | G06F 21/572 |
| 2016/0364577 A1* | 12/2016 | Williams | G06F 21/86 |
| 2017/0006064 A1* | 1/2017 | Agarwal | H04L 9/3263 |
| 2017/0046531 A1* | 2/2017 | Roberts | G06F 21/6218 |
| 2018/0082076 A1* | 3/2018 | Murray | G06F 9/54 |
| 2018/0131629 A1* | 5/2018 | Pulier | G06F 9/45558 |
| 2018/0131724 A1* | 5/2018 | Martinez | G06F 9/455 |

OTHER PUBLICATIONS

Extended EP Search Report for EP Application No. 14196711.7, dated Mar. 18, 2015, 7 pages.

* cited by examiner

STORING DATA IN A SERVER COMPUTER WITH DEPLOYABLE ENCRYPTION/DECRYPTION INFRASTRUCTURE

CROSS-REFERENCE TO RELATED APPLICATION

This application is a continuation of U.S. application Ser. No. 14/959,555, filed Dec. 4, 2015, titled "Storing Data In A Server Computer With Deployable Encryption/Decryption Infrastructure," which claims priority under 35 U.S.C. § 119 to European Patent Application EP 14196711.7, filed Dec. 8, 2014, titled "Storing Data In A Server Computer With Deployable Encryption/Decryption Infrastructure," both of which are incorporated herein by reference in their entirety.

TECHNICAL FIELD

The description in general relates to a computer system that stores data, or more in particular, to a computer system that stores the data in encrypted form.

BACKGROUND

Systems with distributed computers have at least a first computer, or client computer, and a second computer, or server computer. The client and server computers are communicatively connected with each other through a network. Usually, there are many client computers for a single server computer. The client computer is usually operated by a human user. The user accesses a data processing application and/or a database at the server computer.

In the so-called "cloud computing" approach, service providers operate many server computers in a single facility, such as a data centre, or a server farm. The application is available for potentially millions of users as so-called software as a service (SaaS). SaaS can include to store data in databases or in file structures.

Further, the service providers employ server administrators. The server administrators are responsible for the hardware of the server computers (processor, memory etc.), as well as for installation, maintenance etc. of the software that runs on the server computers (operating systems, applications, databases etc.). There can be different administrator roles for different components: such as the hardware administrator, the network administrator, the operating system administrator, the application administrator, the database administrator and so on. The roles can be performed by the same person, or by different persons.

Looking at the data that is processed and stored, it is mandatory that the access to the data is provided exclusively to the user of the client computer, but not for the administrator. This requirement is even more severe if client and server computers belong to different legal entities (in a so-called public cloud approach). The data exclusivity also applies to different users of different client computers.

The administrators need access to the hardware, the operating system etc. but the administrators do not need to have access to the data indeed. However, looking at the technology, the administrators can have access to the data. For example, the hardware administrator could intercept data by reading data from a data storage component (e.g., a disk drive), or by applying simple copy operations that do not require skill for other components. Further, a network administrator could intercept the data traffic to and from the computers.

Administrators are usually persons who are trusted by the operators of the computers and—indirectly—by the users. However, the trust is based on personal behaviour of the administrators, professional obligations outlined in so-called "codes of conduct" or in other policies, non-disclosure agreements with the operators, legal consequences in case of breach etc. Once in a while, particular administrators misuse the trust and spread data to non-authorized persons, or even to the general public. Or, administrator interfaces could be used by unauthorized persons (e.g., hackers).

There is a need for technical measures that further restrict the access to the data even if administrators gain access to same part of the system.

An overview to various architectures for applications and encrypted databases is given in the following reference: Alex Biryukov et al. "Database Encryption" in "Encyclopedia of Cryptography and Security", Jan. 1, 2011, Springer US, Boston, Mass.

SUMMARY

According to embodiments of the present invention, technical measures are mainly implemented at the server computer with an encryption/decryption infrastructure that is deployable to the server computer. In a first configuration, the infrastructure can be sandwiched between the interface to a client computer and an application on the server computer. The infrastructure—when deployed—has a forwarder module that exchanges data between the client computer and the application and that identifies data to be encrypted/decrypted. In a second configuration, the infrastructure can be sandwiched between an application and a data-storage structure, such as a database, a file system, a back-up system, or an archive system. The infrastructure—when deployed—has a forwarder module that exchanges data between the application and the data-storage structure and that identifies data to be encrypted/decrypted.

The infrastructure further has a key control module to provide a key and has crypto module to actually perform encryption/decryption.

The terms "server" and "client" are conveniently used to distinguish the computer into a first computer (e.g., client) that benefits from a service that is provided by a second computer (e.g., server), but the infrastructure could also be provided at the client computer. So the terms are merely labels that are conveniently used for explanation.

The infrastructure—even if deployed—does not yet contain information (such as keys) that would allow an administrator to intercept the data.

It can be advantageous that the keys may only be provided upon receiving a key trigger from the client computer, and that a particular key can be allocated for a particular key-use-definition. The particular key-use-definition collectively stands for a definition that relates a particular key for a particular human user, a particular key for a particular group of human users, a particular key for a particular user role, or a particular key for a particular data structure. The key is secured in a key repository, key provider or data set that is part of the key control module, or by another structure.

It can be advantageous that non-sensitive information is not encrypted and remains in the original form. This can save computing resources (such as processing time and memory consumption), and potentially reduces the frequency a key in the repository is actually accessed. With the assumption that retrieving a key from the repository could be intercepted (because a copy of the key leaves repository), the interception probability is potentially reduced by this measure.

Further, the key remains within the infrastructure, and the modules of the infrastructure can be combined (in two basic options) to minimize communication between the modules. This combination measure further reduces the opportunities to intercept key or data.

Optionally, the infrastructure can be used to secure communication to and from the client computer (e.g., to provide data package encryption/decryption). Optionally, the infrastructure can be used to secure the integrity of the server computer (or parts of it). Optionally, the application can use the infrastructure to encrypt or to decrypt data. Optionally, an external crypto-processor can be used by the infrastructure.

More in detail, a computer-implemented method is provided for configuring a server computer to store data in a data-storage structure of a server computer. The data originates from the client computer that is communicatively connected to the server computer. Data is processed by an application in the server computer. In a deploying step, an infrastructure is deployed to the client or server computer. The infrastructure can be available in a first configuration and/or in a second configuration. The infrastructure has a forwarder module that is adapted to receive data from the from the client computer (first configuration) and/or the application (second configuration) and adapted to identify a data portion. The data portion is to be encrypted. The forwarder module is adapted to read an encrypted data portion from the application (first configuration) and/or from the data-storage structure (second configuration). The encrypted data portion is to be decrypted. The forwarder module is adapted to forward the encrypted data portion to the application and/or to the data-storage structure (depending on the configuration).

The infrastructure further has a crypto module that is adapted to encrypt the data portion with a key and adapted to decrypt the encrypted data portion with the key. The infrastructure further has a key control module that is adapted to generate and to store the key. In a providing step, the key is provided into the key control module upon receiving a key trigger from the client computer.

Providing the key can be performed for the key trigger being associated with a particular key-use-definition of the client computer. In this case, the key control module generates and stores the key as a key for the particular key-use-definition.

Storing data can comprise sub-steps: The forwarder module receives data and identifies the data portion to be encrypted. The crypto module retrieves the key from the key control module according to the particular key-use-definition. The crypto module encrypts the data portion with the key to the encrypted data portion. The forwarder module forwards the encrypted data portion to the application (first configuration) and/or data-storage structure (second configuration).

Retrieving data can comprise sub-steps: The forwarder module reads the encrypted data portion from the data-storage structure. The crypto module retrieves the key from the key control module according to the particular key-use-definition. The crypto module decrypts the encrypted data portion with the key to the decrypted data portion. The forwarder module forwards the decrypted data portion to the interface to the first computer (first configuration) and/or to the application (second configuration).

Storing data (i.e. with receiving data, forwarding data to the application/data-storage structure) and retrieving data (i.e. with reading the encrypted data portion from the application/data-storage structure) can be performed for the rest of the data, wherein the rest bypasses the crypto module. The rest of the data is the complement to the identified data to be encrypted/decrypted. Storing data can be performed for the data-storage structure being a database and/or a file system.

In step deploying the infrastructure to the server computer, two modules can be combined to provide for minimized inter-module communication. In a first option, the forwarder module is combined with the crypto module, and in a second option, the crypto module is combined with the key control module.

The method can be executed by the server computer having central processing unit and main memory. The application and the infrastructure can be loaded into the same main memory.

Deploying the infrastructure can be performed in a way that the modules become plug-ins for the application, or with modules that become plug-ins for the data-storage structure. Plug-ins are sometimes referred to as add-ons.

The client computer can be communicatively connected to the server computer via a gateway that encrypts and decrypts data packages. The keys are generated and stored by the infrastructure. Deploying the infrastructure can be performed for a modified infrastructure with a gateway that is adapted to encrypt and to decrypt data packages for the communication between the client computer and the server computer. The crypto module is also adapted to encrypt data packages leaving the server computer for the client computer and to decrypt data packages arriving at the server computer from the client computer. The key that is provided can be the same key used to encrypt the data portion and to decrypt the encrypted data portion. This measure provides for an advantageous synergetic use of the infrastructure.

A computer program product that—when loaded into a memory of a computer and being executed by at least one processor of the computer—performs the steps of the computer-implemented method.

A server computer comprises: a data-storage structure for storing data, a gateway to establish a communication connection with a client computer, an application that processes data originating from the client computer and that provides processed data to be stored in the data-structure. The infrastructure can be available in a first configuration and/or in a second configuration.

In the first configuration, the infrastructure has a forwarder module that is adapted to receive data from the first computer and adapted to identify a data portion (to be encrypted). In the second configuration, the forwarder module is adapted to receive processed data from the application and adapted to identify a data portion (to be encrypted). The forwarder module is adapted to read an encrypted data portion from the application (first configuration) and/or from the data-storage structure (second configuration). The infrastructure further has a crypto module that is adapted to encrypt the data portion with a key and adapted to decrypt the encrypted data portion with the key, and has a key control module that is adapted to generate and to store the key. In the server computer, the infrastructure can be deployed without keys. The server computer has a key channel that is adapted to communicate a key trigger into the key control module when the key trigger is received from the client computer.

The key channel can receive the key trigger that is associated with a particular key-use-definition of the client computer and the key control module can generate and stores the key as a key for the particular key-use-definition.

The gateway can be adapted to encrypt and to decrypt data packages for the communication between the client computer and the server computer, the crypto module can also be adapted to encrypt data packages leaving the server computer for the client computer and to decrypt data packages arriving at the server computer from the client computer. The key that is provided can be the same key used to encrypt the data portion and to decrypt the encrypted data portion.

The details of one or more implementations are set forth in the accompanying drawings and the description below. Other features will be apparent from the description and drawings, and from the claims.

DETAILED DESCRIPTION

In the figures, most of the references have three digits XYZ. In the block diagrams of FIGS. 1, 4 and 5, the left digit X indicates the figure, and the other digits YZ indicate similar elements. Data encryption is illustrated by an asterisk *. Before encryption or after decryption, data is available in original form, or plain form, as for example in the text string "Frankfurt". After encryption, but before decryption, the data* is, for example, "9546565135478". For simplicity of explanation, the description uses letters (a, b, . . . z) for original data, and numbers (0, 1, . . . 9) for the encrypted data. In real implementations, such a simplification is not necessary.

Encryption and decryption technologies are well known in the art, and commercially or otherwise available, for example in form of libraries. The technologies use keys, and the keys can be symmetric keys (the same key to encrypt and to decrypt) or asymmetric keys (different keys to encrypt and to decrypt). An example is explained in U.S. Pat. No. 4,405,829. For simplicity herein, the term "key" does not differentiate the technology.

Figure 1A:
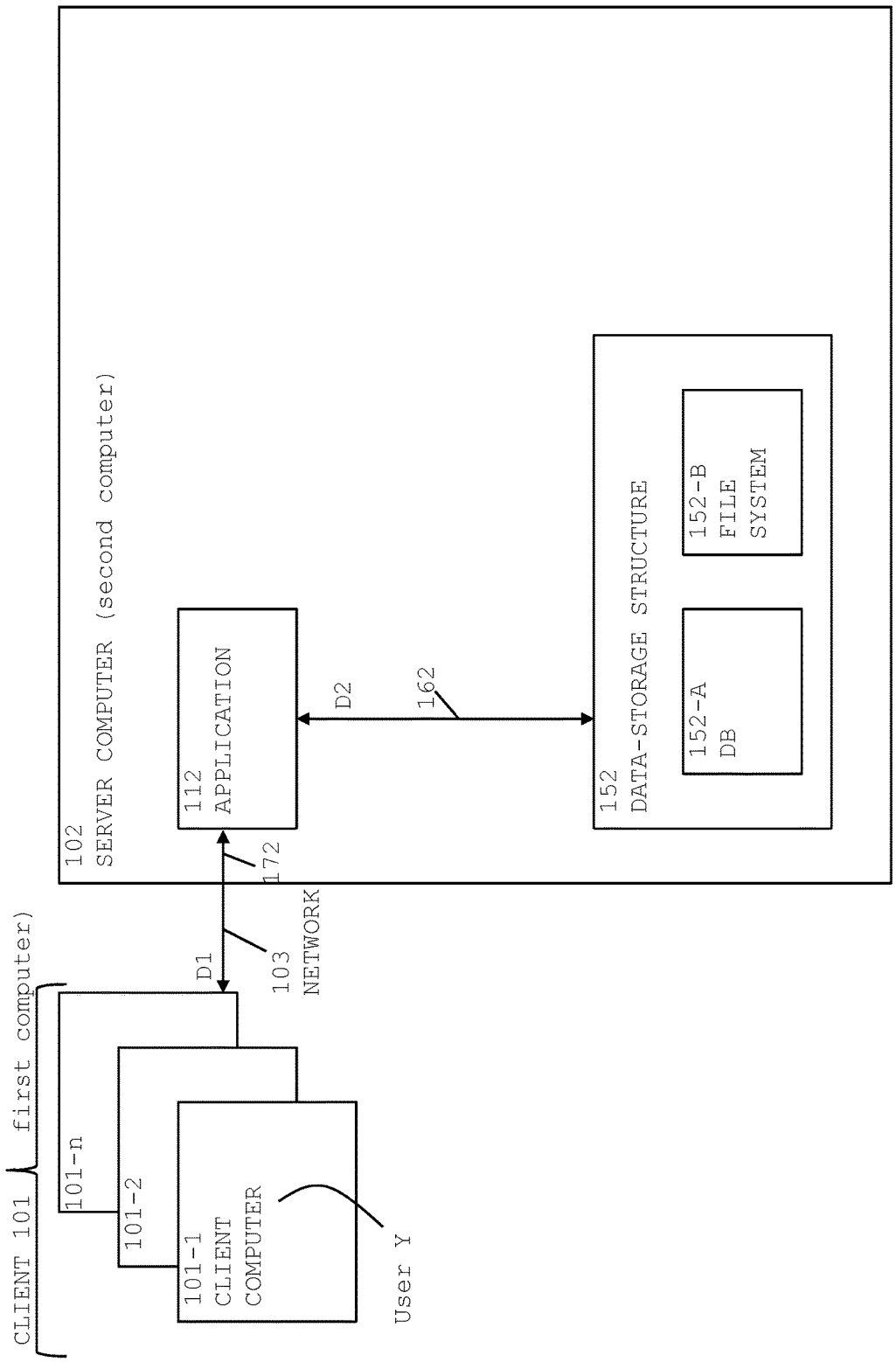
FIG. 1A illustrates a block diagram of a computer system with a client computer and a server computer.

FIG. 1A illustrates a block diagram of computer system 100 with client computer 101 and server computer 102. Computers 101 and 102 are communicatively connected to each other by network 103. Network 103 can be a network that operates according to the Internet protocol suite (TCP/IP etc.).

Typically, client computer 101 can be implemented by multiple client computers 101-1, 101-2, . . . , 101-n. User interfaces for interaction with users can be provided. For example, computer 101-1 interacts with human user Y. It is noted that the user must not necessarily be a human user. For the discussion herein, a distinction into human and non-human user is not relevant. In a scenario that is illustrated by way of example, server computer 102 is located in a data centre. Client computer 101 provides data D1 to application 112 in server computer 102. D1 can also stand for data that is communicated from computer 102 to computer 101.

In server computer 102, application 112 processes data D1 (received from client computer 101) and provides processed data D2 to be stored in data-storage structure 152. Data-storage structure 152 can be database (db) 152-A, file system 152-B, or a combination thereof. Application 112 and data-storage structure 152 communicate via connection 162. D2 can also stand for data that is communicated from data-storage structure 152 to application 112, and vice versa.

The description uses a simplified use-case scenario: User Y works for a first organization that has a variety of employees, among them Alice and Bob. Application 112 should be an application that assists the user Y to identify the most suitable geographical locations for Alice and Bob to work. Application 112 can have a web interface, and user Y operates a web browser. Data that is exchanged between computers 101 and 102 (or browser and application) is referred to as data D1. User Y can identify locations by simply pointing with a mouse on a map.

The names for the identified locations (e.g., the text strings "Darmstadt" and "Frankfurt") and the employee names (e.g., the text strings "Alice" and "Bob") is data D2 to be stored in data-storage structure 152.

Looking at the data, it is assumed that the names (Alice and Bob) are not sensitive, but it is further assumed that the identified locations (e.g., the cities Darmstadt and Frankfurt) are sensitive. The sensitive data needs to be protected against non-authorized access, for example, by a second organization (that competes with the first one).

The administrator (of server computer 102) could intercept data at a variety of technical access points, for example, data D1 at interface 172 between network 103 and application 112 (to derive the locations from mouse positions), or data D2 along connection 162. Further, the administrator could also intercept data by destroying the integrity of server computer 102.

As explained in the following, embodiments of the invention mitigate the potential data interception by providing a deployable encryption/decryption infrastructure within interface 172 (in a first configuration, cf. FIG. 1B) or within connection 162 (second configuration, cf. FIG. 1C). In other words, interface 172 or connection 162 is at least partially implemented or replaced by the infrastructure. Details are illustrated with FIGS. 1B, 2 and 3. Optionally, the infrastructure can be used to provide data encryption at the network-to-application interface as in FIG. 4, and to provide support data for an external crypto-processor as in FIG. 5.

Figure 1B:
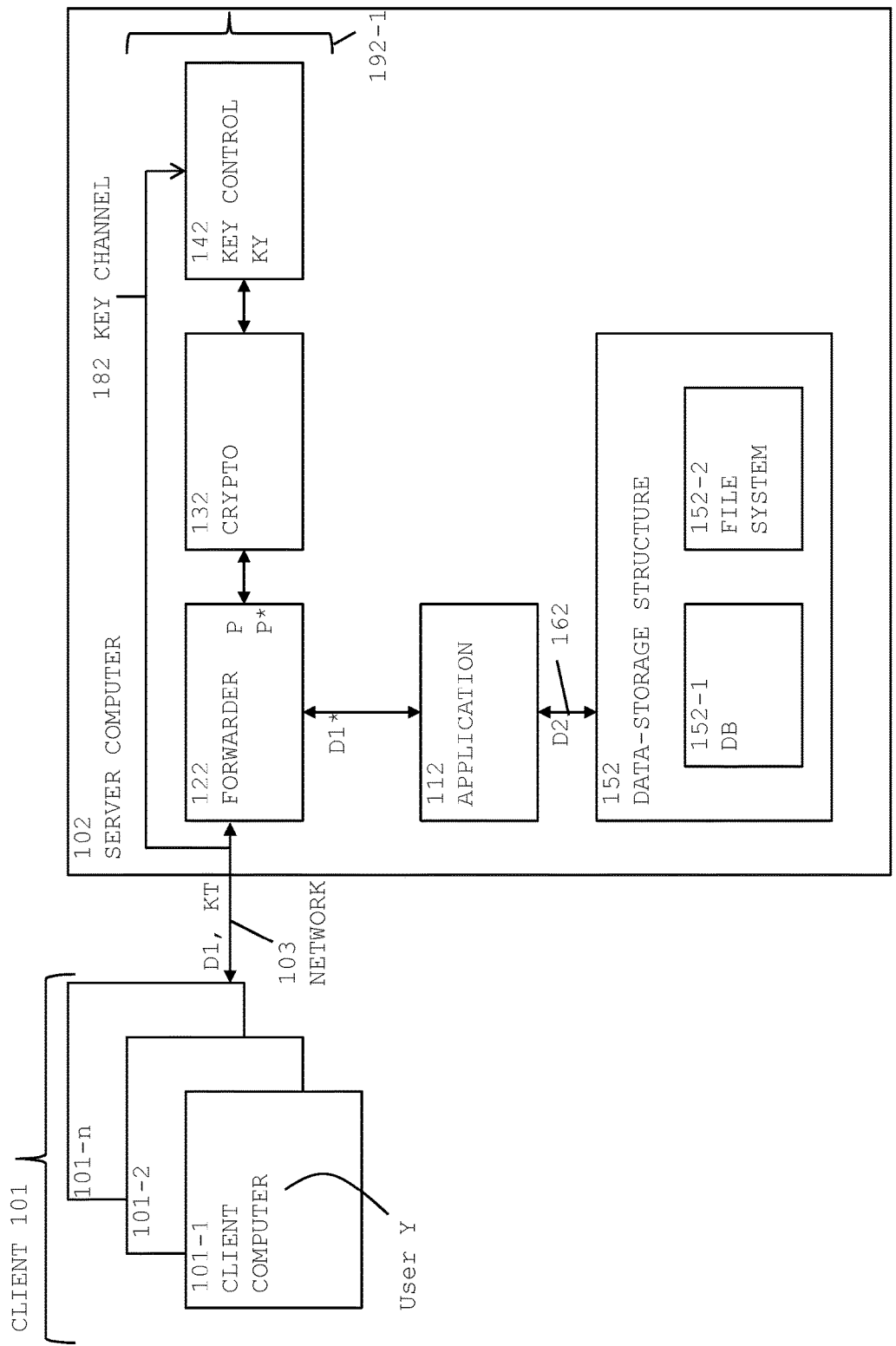
FIG. 1B illustrates a block diagram of a computer system with the client computer and the server computer, wherein an encryption/decryption infrastructure in a first configuration has been deployed to the server computer.
Figure 1C:
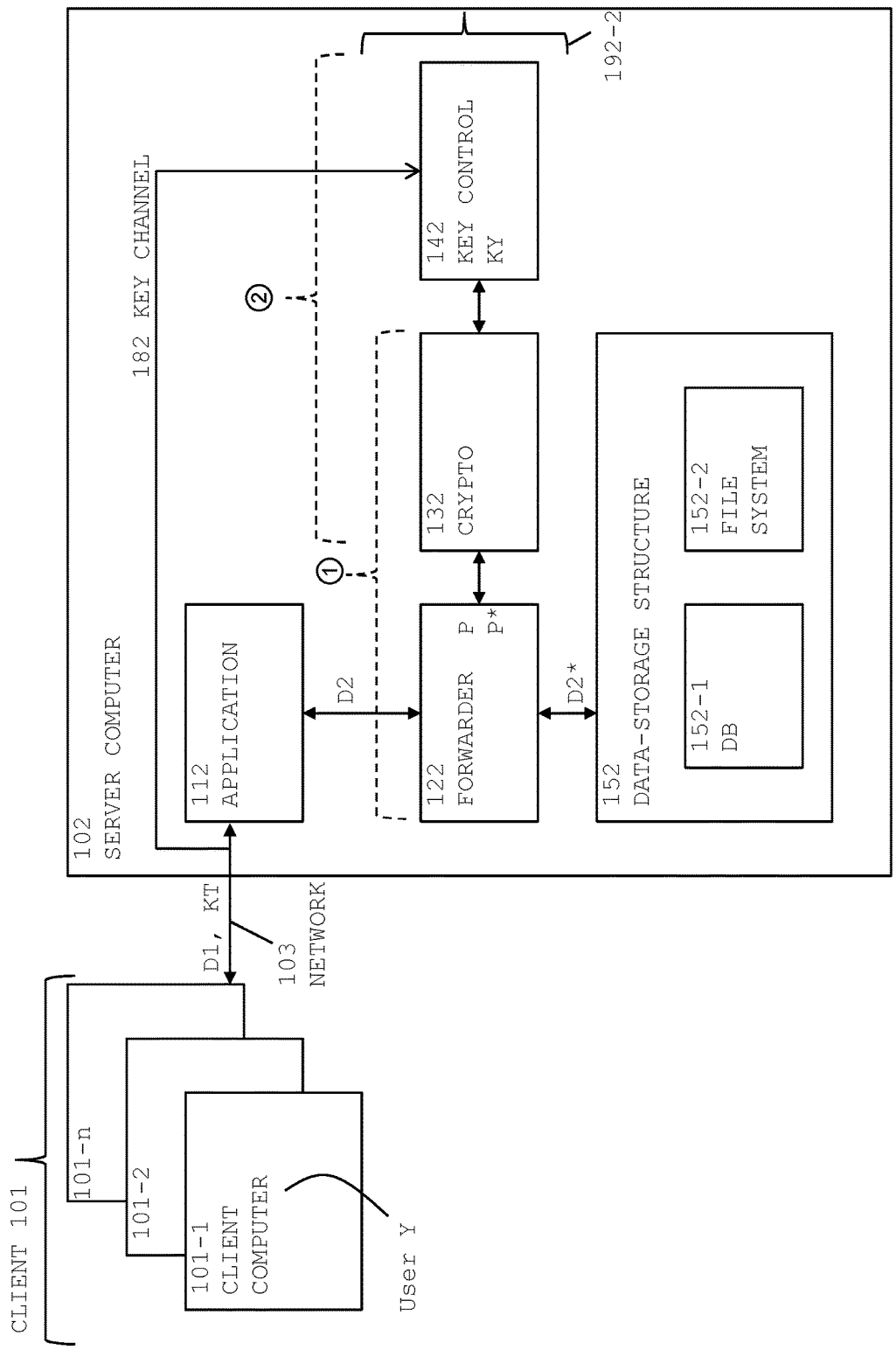
FIG. 1C illustrates a block diagram of a computer system with the client computer and the server computer, wherein an encryption/decryption infrastructure in a second configuration has been deployed to the server computer.

FIG. 1B and FIG. 1C illustrate block diagrams of computer system 100 with client computer 101 and server computer 102, wherein infrastructure 192 has been deployed to server computer 102. Infrastructure 192 can be deployed in a first configuration 192-1 between an interface of server computer 102 to the client computer 101 and application 112. Infrastructure 192 can be deployed in a second configuration 192-2 between application 112 and data-storage structure 152. The following description uses the second configuration 192-2 as the example for explanation, wherein reference 192 collectively stands for both.

It is noted that the configurations not necessarily have to be true alternatives. Infrastructures 192-1 and 192-2 can be deployed to be used at the same time. Infrastructures 192-1 and 192-2 can be deployed at different points in time.

Infrastructure 192 comprises forwarder module 122, crypto module 132, and key control module 142.

Forwarder module 122 is coupled between application 112 and data-storage structure 152 and (at least partially) replaces connection 162 (cf. FIG. 1A) or intercepts connection 162. Looking from application 112, forwarder module 122 is adapted to receive (from application 112) data D2, and forwarder module 122 is adapted to identify data portion P to be encrypted. Looking from data-storage structure 152, forwarder module 122 is adapted to read (from data-storage structure 152) encrypted data portion P* to be decrypted.

Crypto module 132 communicates both with forwarder module 122 and key control module 142. Crypto module 132 is adapted to encrypt data portion P and is adapted to decrypt encrypted data portion P* with a key.

Key control module 142 is adapted to generate and to store the key (in a repository). There is no need to store the key in the data-storage structure or elsewhere. In the example, key control module 142 is adapted for keys to be associated, for example, with a particular key-use-definition of client computer 101 (e.g., key KY for human user Y).

The particular key-use-definition that is associated with the key can be defined for other association schemes as well: A particular storage scheme can be adapted for relational databases (e.g., employee names and location names in a table of a relational database with a column for the employee name and a column for the location names, the key for the location column). Specific content such as content with sensitive data (e.g., sales figures) can be also associated with a particular key for users (e.g., user groups, or user roles) that have access rights to this sensitive data. Also, in case that multiple applications are installed on server computer 102, there can be application specific keys.

In case that the key belongs to a pair of asymmetric keys, the key in key control module 142 can be the private key, and the user of client computer 101 can use the public key, or vice versa.

It is advantageous that infrastructure 192 can be deployed into server computers that are already in operation. The infrastructure is deployed from code that the server computer 102 receives or imports from external sources, for example, from an external code server (via network 103), or from a data carrier (e.g., CD-ROM, DVD, USB stick).

Deploying includes that code for the function of the modules is imported from outside the server computer, and that the code is made available to the processor of the server computer for execution. Deploying can be performed, for example, (1) by providing self-extracting file and opening this file so that the code for the modules becomes available for the server, (2) by installing a web archive into a servlet-engine or into a web-application server, (3) by using a virtual machine image that performs the functions of the modules, (4) by using the virtual machine image as a software-as-a-service (SaaS) offering on the server computer, or otherwise. The code does not necessarily contain the key, and even after deployment, infrastructure 192 does not yet contain the keys.

Further, the key is provided when needed. In some sense, this de-couples the availability of the key from the availability of the infrastructure: the infrastructure may be available without the key. The key is provided in key control module 142 when server computer 102 receives a key trigger KT from client computer 101. The key trigger KT can be communicated into key control module 142 by key channel 182.

The key trigger can be received from a client computer separate from client computer 101. For example, client computer 101-1 can be dedicated to user Y, and client computer 101-2 can be dedicated to an administrator user. It is noted that the key trigger KT can be generated automatically, for example, based on pre-defined rules. For simplicity of explanation, the description however assumes a single client computer 101.

The generated key stays within the infrastructure 192 (in module 142) but does not have to leave it. There is no need to forward the key to application 112, and no need to forward the key to data-storage structure 152. Only crypto-module 132 is able to perform cryptographic operations with these keys.

Persons of skill in the art can implement methods for generating and managing multiple keys, for example, for multiple users, for multiple storage schemes and so on. Techniques for data binding (e.g., to relate user identification ID to the keys) are well-known.

The key trigger (KT) is associated with a particular key-use-definition of client computer 101.

In case the particular key-use-definition is a human user (Y), key control module 142 generates and stores the key (KY) as a key (KY) for the particular human user (Y).

In operation (or run-time of infrastructure 192)—that means after infrastructure 192 has been deployed and the key has been provided, server computer 102 stores and retrieves data D2.

To store data, forwarder module 122 receives data D2 from application 112 and identifies data portion P to be encrypted (e.g., the location names), crypto module 132 retrieves the key from key control module 142 according to the particular key-use-definition (e.g., user Y), encrypts data portion P to encrypted data portion P*, and forwarder module 122 writes P* to data-storage structure 152.

To retrieve data, forwarder module 122 reads the encrypted data portion P* from data-storage structure 152, crypto module 132 (again) retrieves the key from key control module 142 according to the particular key-use-definition (e.g., user Y) and decrypts P* to decrypted data portion P, and forwarder module 122 forwards P to application 112.

Generally, there is no need to specially adapt the data-storage structure 152. Minor adaptations can be implemented. For example, the length of a string in a database can be adapted to the maximal length of a string with encrypted data. Non-encrypted data can be bypassed. This is advantageous to save computation-processing resources.

As mentioned, data-storage structure 152 can be a database or a file-system (or a combination). The example of a database with a table, the names Alice and Bob are stored in a name column, and the (sensitive) location is stored in a location column, in encrypted form. The example can also be combined with a file system; the location column may store pointers to files in picture format. The pictures can represent the locations with more details and could differentiate locations at street level. In this case, the picture files may be encrypted. An administrator who gains access to the data-storage structure would not be able to use (or to decrypt) the data, unless the administrator also obtains access to the key. As mentioned, the keys are stored elsewhere.

Two modules can be combined to provide for minimized inter-module communication. This measure may be advantageous because possibly it complicates non-authorized key interception. In a first option $\hat{1}$, forwarder module 122 is combined with crypto module 132, in a second option $\hat{2}$, crypto module 132 is combined with key control module 142.

Server computer 102 has a central processing unit (CPU) and a main memory. It is possible to execute application 112 and infrastructure 192 with physically the same main memory. The modules (122, 132, 142) can be plug-ins for application 112, or can be plug-ins for data-storage structure 152, or be executed by further computers, such as by a computer that is dedicated to implement the infrastructure.

As mentioned, the description uses the second configuration 192-2 as example. In case of the first configuration 192-1 of the infrastructure, data to be encrypted/decrypted is D1 (and not D2), and data is exchanged between client computer 101 (instead of application 112) and application 112 (instead of data-structure 152). It is noted that application 112 can process data that is encrypted. For example, the name of a location can be processed in encrypted form as long the location name is not further processed.

Figure 1D:
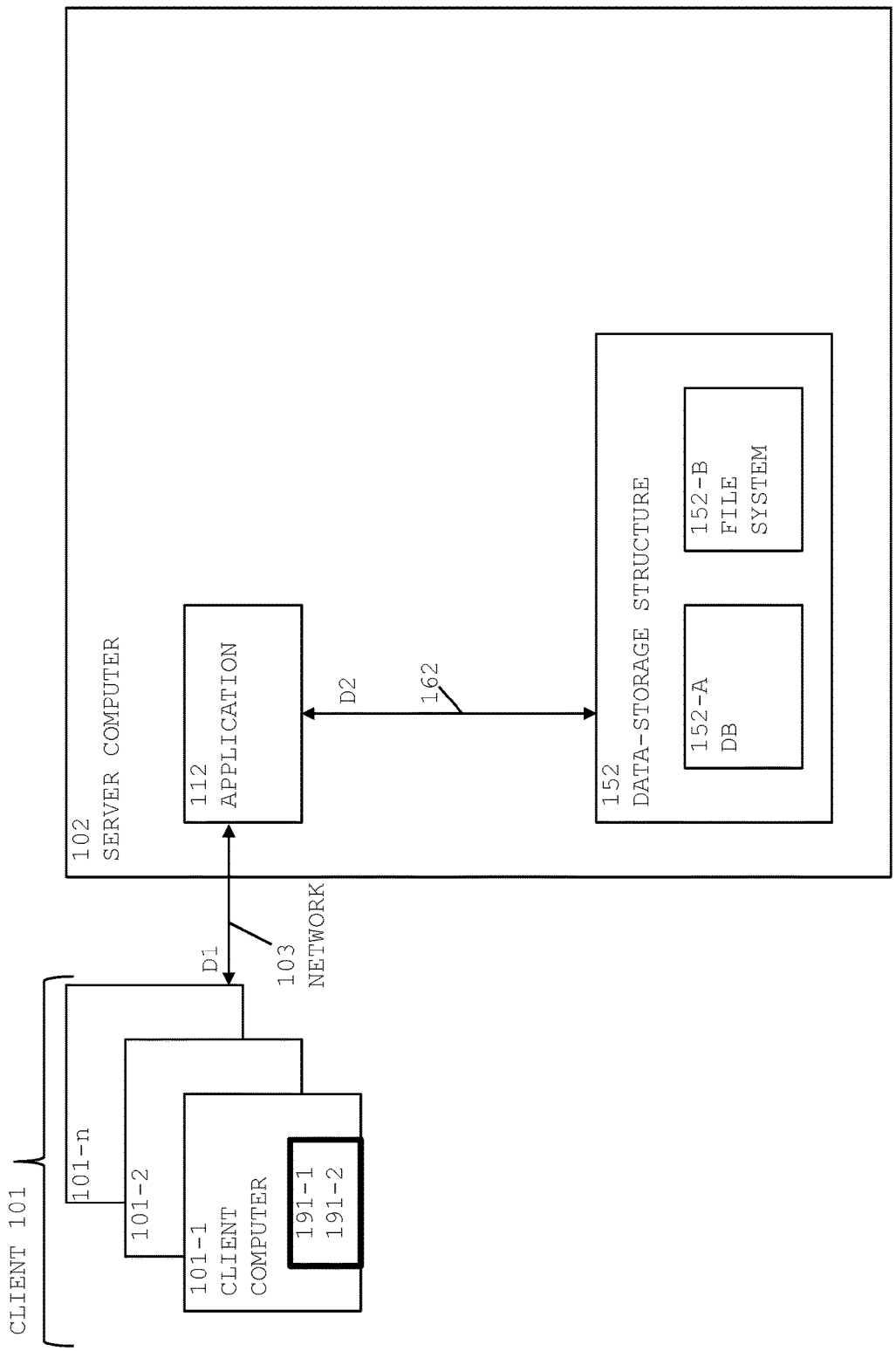
FIG. 1D illustrates a block diagram of a computer system with the client computer and the server computer, wherein an encryption/decryption infrastructure has been deployed to the client computer.

FIG. 1D illustrates a block diagram of a computer system with client computer 101 and server computer 102, wherein encryption/decryption infrastructure 191 has been deployed to client computer 101. As mentioned, the terms "client" and "server" are just labels to distinguish first and second computers. Based on the description herein, persons of skill in the art can provide infrastructure 191-1 (first configuration for data between computer 102 and an application on computer 101), or infrastructure 191-2 (second configuration between application and data-storage structure on computer 101) without the need of further explanation herein.

Figure 2:
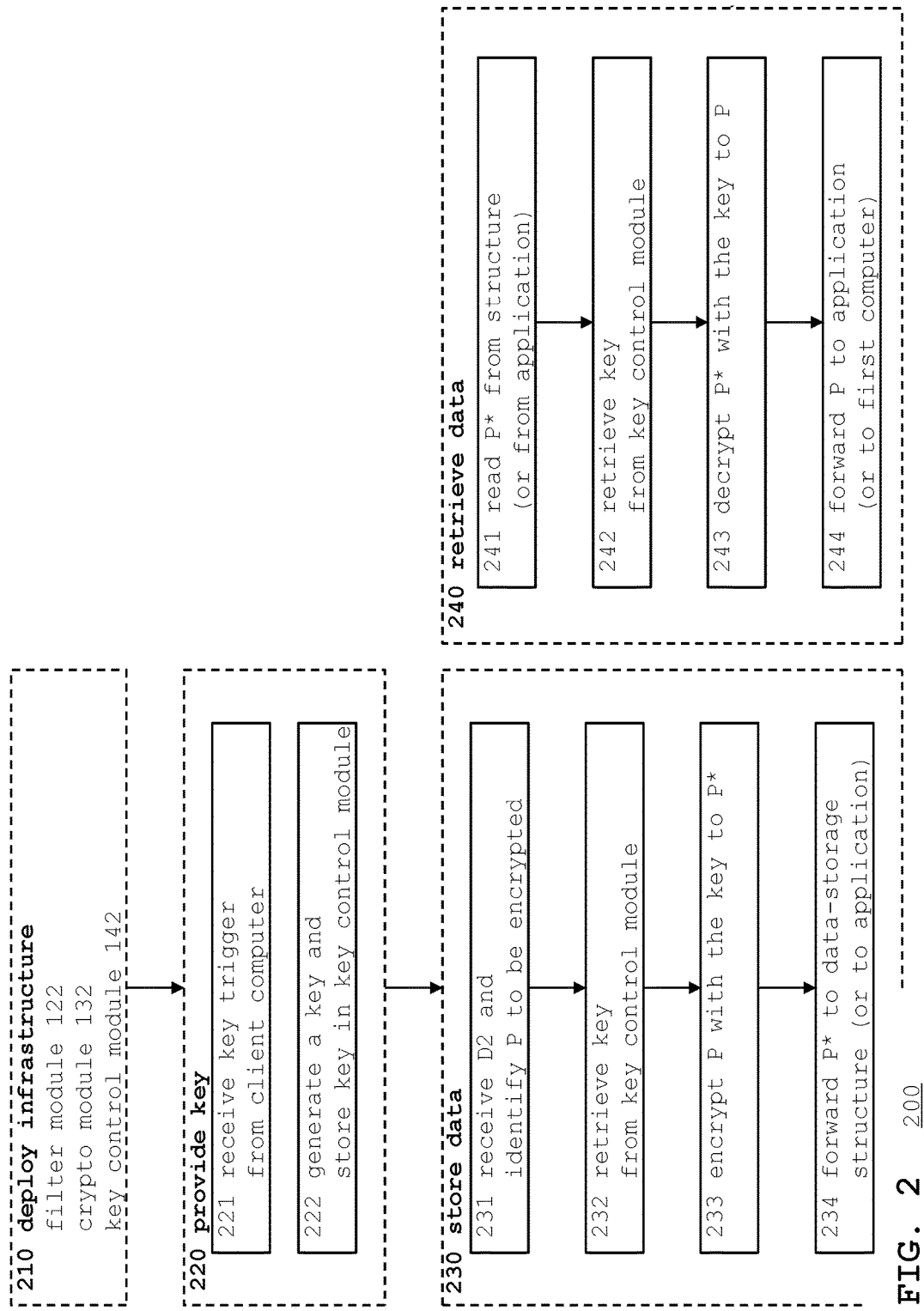
FIG. 2 illustrates a flow chart diagram of a computer-implemented method for storing data in a data-storage structure of the server computer, wherein the server computer uses the infrastructure.

FIG. 2 illustrates a flow chart diagram of computer-implemented method 200 for storing data in data-storage structure 152 of server computer 102. As explained above, data D1, D2 originates from client computer 101 that is communicatively connected to server computer 102, and data D1, D2 is processed by application 112 in server computer 102. FIG. 2 uses infrastructure 192 in the second configuration as the example. Labels that are applicable for the first configuration are given in parenthesis.

Method 200 comprises deploying 210 the infrastructure and providing 220 the key. More in detail, in step deploying 210, infrastructure 192 is deployed to server computer 102.

Infrastructure 192 has a forwarder module 122, crypto module 132 and key control module 142. Forwarder module 122 is adapted to receive 231—from application 112—data D2 and is adapted to identify data portion P to be encrypted. Forwarder module is also adapted to read 241 encrypted data portion P* to be decrypted (from data-storage structure 152). Crypto module 132 is adapted to encrypt data portion P and is adapted to decrypt encrypted data portion P* with a key (e.g., key KY). Key control module 142 is adapted to generate and to store 222 the key (e.g., KY).

Step 220 (providing the key) is performed upon receiving 221 a key trigger (KT) from client computer 101. The key is provided into key control module 142. The presence of the trigger is a condition for performing this step.

Providing 220 the key can be performed for the key trigger (KT) being associated with a particular key-use-definition (e.g., user Y) of client computer 101. In step providing 220, key control module 142 can generate and store 222 the key (KY) as a key (KY) for the particular key-use-definition (Y).

Step storing 230 data can comprise the following sub-steps: receiving 231 data, identifying data portion P, retrieving 232 the key, encrypting 233 the data portion P; and forwarding 234. In sub-step receiving 231, forwarder module 122 receives data D2 and identifies the data portion (P) to be encrypted. In sub-step retrieving 232, crypto module 132 retrieves the key (KY) from key control module 142 according to the particular key-use-definition (Y). In sub-step encrypting 233, crypto module 132 encrypts data portion P with the key (KY) to encrypted data portion P*. In step forwarding 234, forwarder module 122 forwards encrypted data portion P* to data-storage structure 152.

Retrieving 240 data can comprise the following sub-steps: reading 241, retrieving 242, decrypting 243 and forwarding 244. In sub-step reading 241, forwarder module 122 reads encrypted data portion P* from data-storage structure 152. In sub-step retrieving 242, crypto module 132 retrieves the key (KY) from key control module 142 according to the particular key-use-definition (Y). In sub-step decrypting 243, crypto module 132 decrypts encrypted data portion P* with the key (KY) to decrypted data portion P. In sub-step forwarding 244, forwarder module 122 forwards decrypted data portion P to application 112.

Storing data 230 (with the sub-steps explained above) can be performed also for the complementary rest D2exP of data D2. The complementary rest is data D2 except P. In this case, the rest D2exP bypasses crypto module 132.

Step storing 230 can be performed for data-storage structure 152 being a database, a file system or a combination of database and file-system.

In step deploying 210 the infrastructure to the server computer, two modules can be combined to provide for minimized inter-module communication. In a first option $\hat{1}$, forwarder module 122 is deployed as a combination with crypto module 132. In a second option $\hat{2}$, crypto module 132 deployed as a combination with key control module 142.

In an implementation aspect, method 200 can be executed by server computer 102 (having central processing unit and main memory) in that application 112 and infrastructure 192 are being loaded into physically the same main memory.

Deploying 210 the infrastructure can be performed with the modules (forwarder module 122, crypto module 132, key control module 142) being plug-ins for application 112, or being plug-ins for data-storage structure 152.

As it will be explained with more detail in connection with FIG. 4, the method can be performed in a configuration in that client computer 101/401 is communicatively connected to server computer 102/402 via gateway 407 that encrypts and decrypts data packages. The keys are generated and stored 222 by infrastructure 192/492 (122/422, 132/432, 142/442).

Further, a computer-implemented method is provided for deploying a key into key control module 142 of server computer 102. Server computer 102 is adapted to execute an application 112 for processing data D1 received from client computer 101. Server computer 102 is further adapted to maintain data-storage structure 152 for storing data D2 that has been processed by application 112. The method comprises: receiving a key trigger that is associated with a particular key-use-definition (of the client computer 101), and generating a key by key control module 142.

Sub-step 221 (receiving) is illustrated with a key trigger originating from the client computer and being related to the user of the client computer. It is however possible to receive the key trigger from an administrator user (of server computer 102).

Optionally, sub-step 231 (receiving) can also include to receive D1 (i.e., data prior to processing) and to identify portions to be encrypted in D1. Also, in case that the application only forwards data without processing, D1 and D2 would be substantially the same.

Optionally, sub-step 234 (forwarding) can include to forward D2 without P* so that encrypted data (P*) and non-encrypted data (D2exP*) are forwarded. In other words, for step 230 (store data) there are two alternative options: In a first option, D2 (or D1) including P is received, P is encrypted to P*, and D2 (or D1) including P* is forwarded. In a second option, data is encrypted completely, so that identifying P (in 231) is simplified to take D2 (or D1) as P*.

With respect to the first configuration, the following modifications in parenthesis apply: step 231 with data D1, step 234 with forwarding to the application, step 241 with reading from the application, and step 244 with forwarding to the first computer.

FIG. 2 also illustrates a computer program or a computer program product. The computer program product—when loaded into a memory of the server computer and being executed by at least one processor of the server computer—performs the steps of the computer-implemented method. So in other words, the blocks in FIG. 2 illustrate that the method can be implemented by the server computer under the control of the program.

Figure 3:
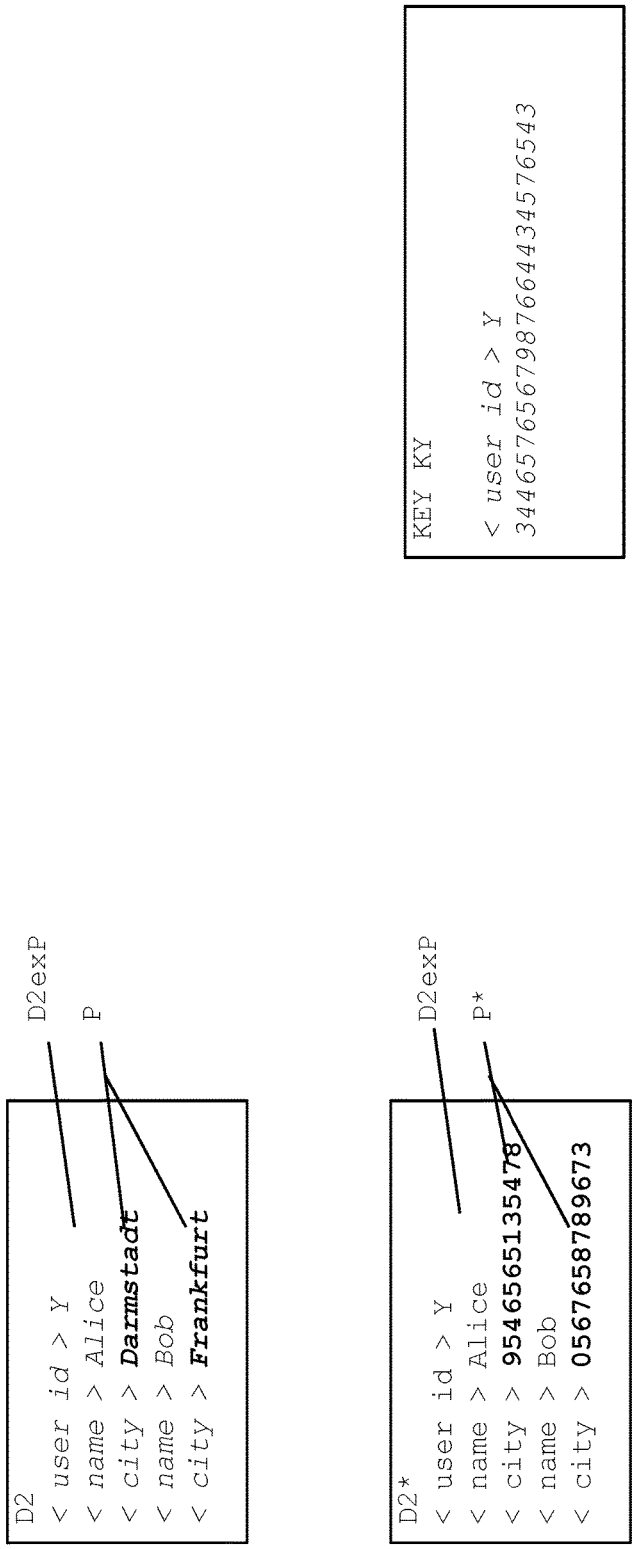
FIG. 3 illustrates data in original form and in encrypted form by way of example.

FIG. 3 illustrates data in original form D2 and in encrypted form D2* by way of example in pseudo-code. In the example, user Y uses application 112 to identify geographical locations at city level for the two employees. Much simplified, application 112 provides a data set D2 to be stored in data-storage structure 152 with sub-structures (e.g., a database columns) for the "name" and for the "city", in combination with a user ID. Such a data set can be received by forwarder module 122 (cf. sub-step 231).

According to predefined rules, forwarder module 122 identifies the "city" to be encrypted (data portion P). Crypto module 132 retrieves key KY that corresponds to user Y and provides encrypted data portion P*. The modified data set D2* also comprises portions that are stored as plain text (D2exP).

Having explained the infrastructure and its operation in view of encrypting/decrypting data, the description continues with further aspects. With the infrastructure as described in connection with FIGS. 1A, 2 and 3, there would be still the risk that a non-authorized person gains access to the communication connection between client and server computers or gains access to the server as a whole. It is advantageous that the same infrastructure can be used to protect the inter-computer communication (cf. FIG. 4) and to protect the integrity of the server computer (cf. FIG. 5).

Figure 4:
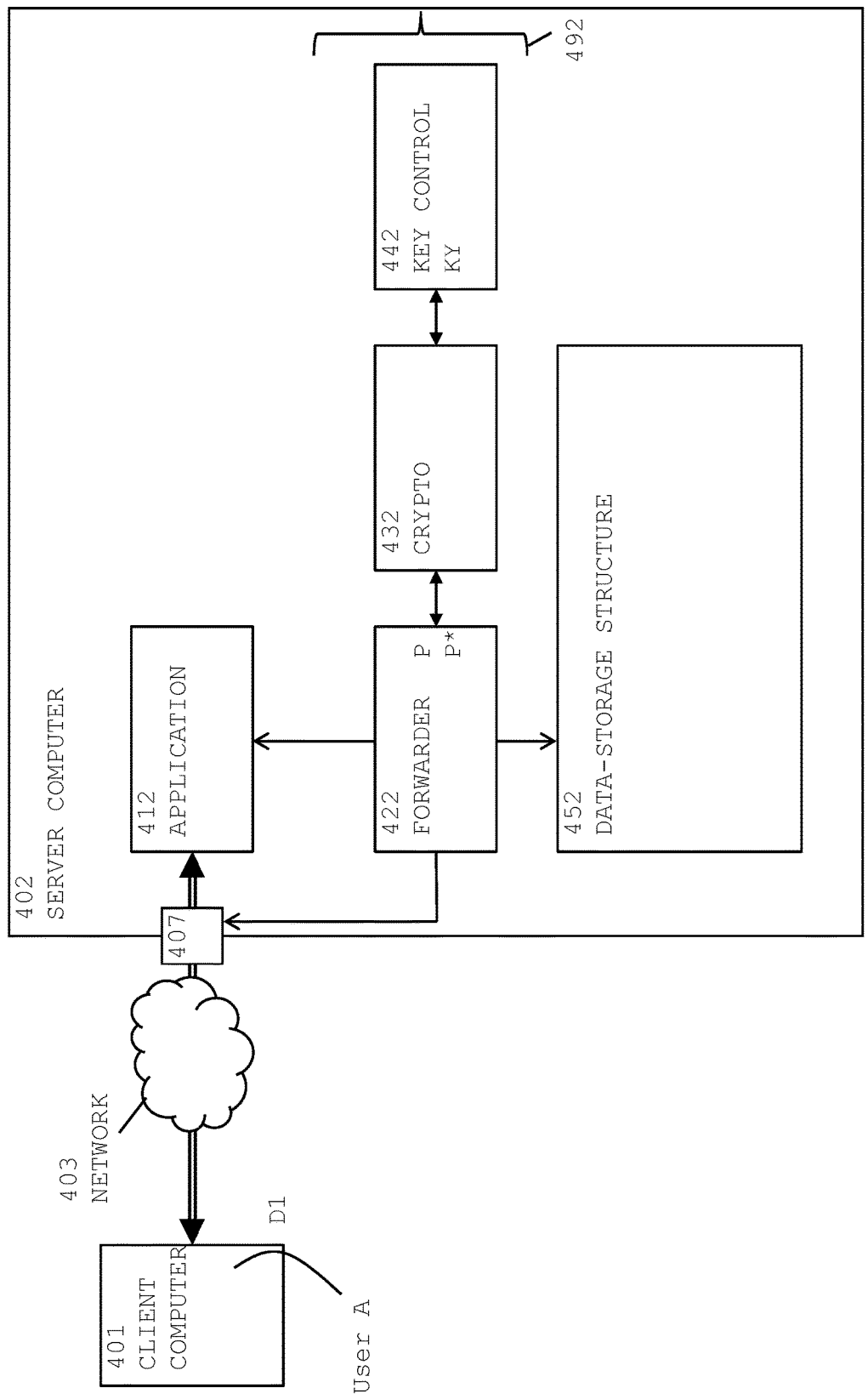
FIG. 4 illustrates a block diagram of the computer system, wherein the infrastructure in the server computer provides encryption and decryption for the communication between the client computer and the server computer, application and data-storage.

FIG. 4 illustrates a block diagram of computer system 400, wherein infrastructure 492 in server computer 402 provides encryption and decryption for the communication between client computer 401 and server computer 402. In other words, client computer 401 is communicatively connected to server computer 402 via gateway 407 that encrypts and decrypts data packages. The keys are generated and stored by the infrastructure. In other word, FIG. 4 illustrates the option to place the forwarder (i.e., gateway 407) in front of application 412. It is also possible to dedicate a second infrastructure (with crypto module, key control module, gateway/forwarder) for this communication.

More in detail, data D1 is communicated between computers 401 and 402 through gateway 407. Gateway 407 decrypts data packages that arrive at server computer 402, and gateway 407 encrypts data packages that leave server computer 402. This technique allows that network 403 can be part of a larger network such as the Internet. The keys for gateway 407 are provided by the infrastructure. In this embodiment, gateway 407 is similar as forwarder 422 (that is still used for the communication between application 422 and data-storage structure 452). There is however a difference: gateway 407 encrypts/decrypts data packages (at a transport layer) and forwarder 422 encrypts/decrypts data set (at an application layer).

It is advantageous that—for the same user of client computer 401—the logistics for retrieving the key have to be performed only once, again saving computation resources (in computer 402). In the scenario, user Y (of computer 401) accesses application 412 through a connection that is secured as described, and resulting data D2 stored (or retrieved) substantially at the same time. It is noted that the same key could be used for both communications (401/402 and 412/452), this potentially saving resources.

For this gateway approach of FIG. 4, the above-described method is enhanced: Deploying 210 the infrastructure is performed for modified infrastructure 492 (with gateway 407 adapted to encrypt/decrypt data packages for the communication between the server and client computers). Crypto module 402 is deployed as being able to encrypt data packages (leaving server computer 402 for the client computer 401) and to decrypt data packages (arriving at server computer 402 from client computer 401). The key (KY) that is provided (step 220) can be the same key used to encrypt (233) the data portion (P) and to decrypt (243) the encrypted data portion (P*). This approach re-uses computation resources, so that some infrastructure elements (e.g. key control module) can be implemented as a single element.

Optionally, a central key management can be used as the basis for single-sign-on (SSO), and for a centralized management of user roles and user rights.

Client computer 401 is communicatively connected to server computer 402 via gateway 407 that encrypts and decrypts data packages. The keys are generated and stored 222 by infrastructure 492.

It is advantageous that the above-explained infrastructure can also be used for virtual private network (VPN). It is advantageous that the above-explained infrastructure can also be used by application 412 and data-storage structure 452.

Figure 5:
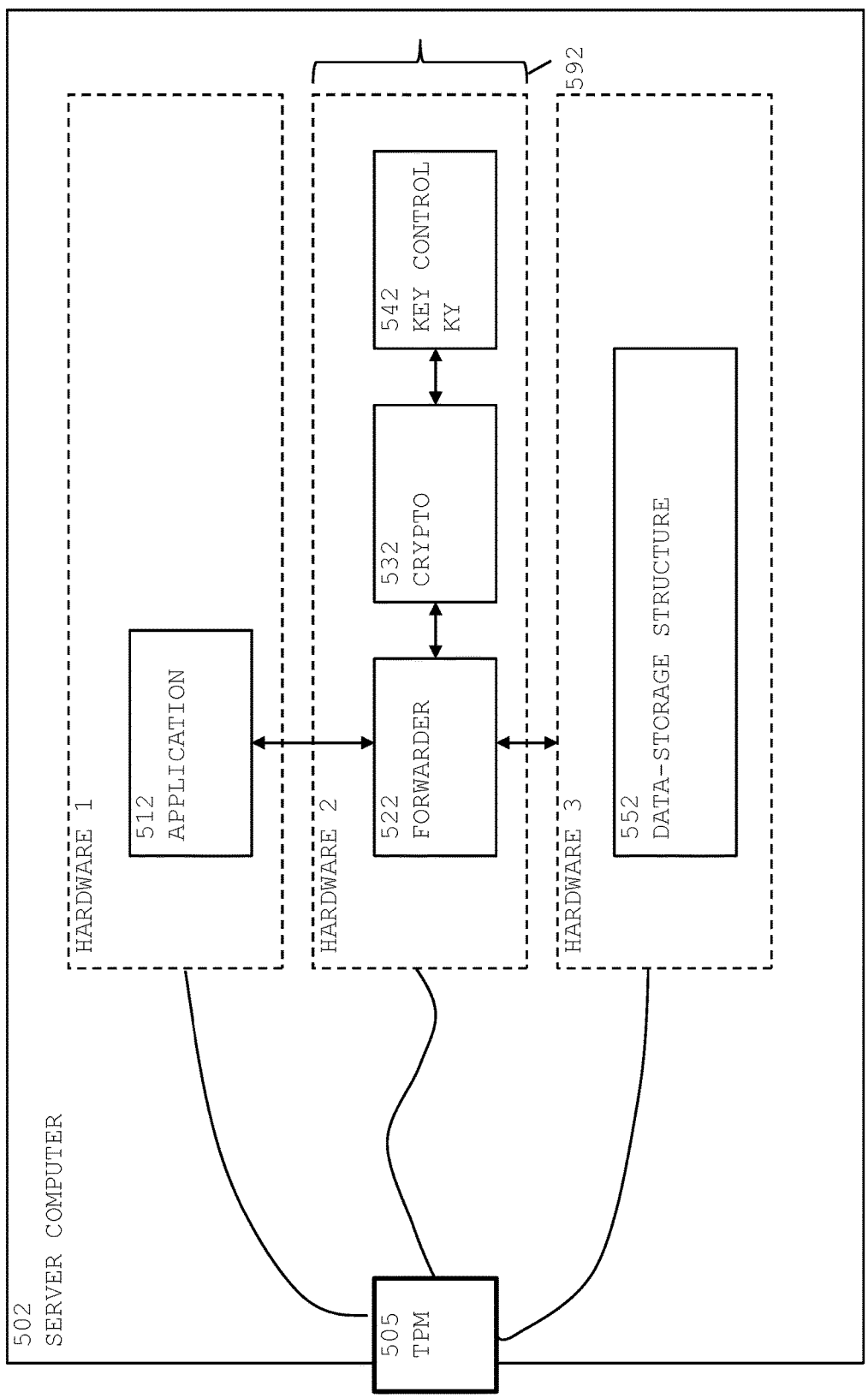
FIG. 5 illustrates a block diagram of the computer system, wherein the infrastructure provides encryption functionality for a crypto-processor.

FIG. 5 illustrates a block diagram of computer system 500, wherein the infrastructure provides encryption functionality by using a crypto-processor 505. Crypto-processor 505 can be implemented as a dedicated computer on a chip for carrying out cryptographic operations. Crypto-processor 505 can operate according to the Trusted Platform Module (TPM) standard, can be a Hardware Security Module (HSM) or a Smart-Card.

Keys stored in the infrastructure can be secured with the crypto-processor. In this sense, the crypto-processor can provide functionality of an external key repository, and can provide cryptographic functions.

In the example if FIG. 5, application 512, infrastructure 592, data-storage structure 552 are implemented with separate hardware, i.e., separate processors and memory. This separation is illustrated by dashed rectangles, for hardware 1, 2, and 3, respectively. Crypto-processor 505 can provide functionality for all hardware.

The description closes by explaining further implementations and use-cases. For example, the application can be an application to control a network-attached storage (NAS) that may be attached to the server computer. The data-storage structure can use file and folder encryption/decryption provided by the operating system of the server computer, but the keys can be controlled by the infrastructure. As explained in connection with FIG. 5, the server computer can be implemented by physically separate hardware components. In case the components are separate computers that communicate via a network (i.e. intra-server network), the infrastructure in general and the forwarder in particular can be regarded as a proxy.

The predefined rules for the identification of the portion to be encrypted by the forwarder module can be obtained from a user of the client computer, for example, from a manager user that sets up data-protection policies. In this respect, the manager user takes over some administration functions for the server computer. A user interface for obtaining the rules can be provided. In the particular Alice and Bob example, the manager user has decided that only the city identification has to be secured.

Embodiments of the invention can be implemented in digital electronic circuitry, or in computer hardware, firmware, software, or in combinations of them. The invention can be implemented as a computer program product, for example, a computer program tangibly embodied in an information carrier, for example, in a machine-readable storage device, for execution by, or to control the operation of, data processing apparatus, for example, a programmable processor, a computer, or multiple computers. A computer program as claimed can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network. The described methods can all be executed by corresponding computer products on the respective devices, for example, the first and second computers, the trusted computers and the communication means.

Method steps of the invention can be performed by one or more programmable processors executing a computer program to perform functions of the invention by operating on input data and generating output. Method steps can also be performed by, and apparatus of the invention can be implemented as, special purpose logic circuitry, for example, a field programmable gate array (FPGA) or an application-specific integrated circuit (ASIC).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computer are at least one processor for executing instructions and one or more memory devices for storing instructions and data. Generally, a computer will also include, or be operatively coupled to receive data from or transfer data to, or both, one or more mass storage devices for storing data, for example, magnetic, magneto-optical disks, optical disks or solid state disks. Such storage means may also provisioned on demand and be accessible through the Internet (e.g., Cloud Computing). Information carriers suitable for embodying computer program instructions and data include all forms of non-volatile memory, including by way of example semiconductor memory devices, for example, EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, for example, a cathode ray tube (CRT) or liquid crystal display (LCD) monitor, for displaying information to the user and an input device such as a keyboard, touchscreen or touchpad, a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input.

The invention can be implemented in a computing system that includes a back-end component, for example, as a data server, or that includes a middleware component, for example, an application server, or that includes a front-end component, for example, a client computer having a graphical user interface or a Web browser through which a user can communicate with an implementation of the invention, or any combination of such back-end, middleware, or front-end components. Client computers can also be mobile devices, such as smartphones, tablet PCs or any other handheld or wearable computing device. The components of the system can be interconnected by any form or medium of digital data communication, for example, a communication network. Examples of communication networks include a local area network (LAN) and a wide area network (WAN), for example, the Internet or wireless LAN or telecommunication networks.

The computing system can include clients and servers. A client and a server are generally remote from each other and typically interact through a communication network. The relationship of client and server arises by virtue of computer programs running on the respective computers and having a client-server relationship to each other.

REFERENCES

| | | |
|---|---|---|
| x | 1, 4, 5; | |
| | x00 | computer system |
| | x01 | client computer |
| | x02 | server computer |
| | x03 | network |
| | x12 | application |
| | x22 | forwarder module |
| | x32 | crypto module |
| | x42 | key control module |
| | x52 | data-storage structure (-A database, -B file system) |
| | x92 | infrastructure, −1, −2 (configurations) |
| | 162 | connection |
| | 172 | interface |
| | 182 | key channel |
| | 191 | infrastructure |
| | 200 | method |
| | 210 | deploy infrastructure |
| | 220 | provide key (sub-steps 221, 222) |
| | 230 | store data (sub-steps 231, 232, 233, 234) |
| | 240 | retrieve data (sub-steps 241, 242, 243, 244) |

| | |
|---|---|
| 407 | gateway |
| 505 | crypto-processor |

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for configuring a second computer to store data in a data-storage structure, wherein the data originates from a first computer that is communicatively connected to the second computer, and wherein the data is processed by an application in the second computer, the method comprising:
   deploying an infrastructure having two configurations and configured to be deployed in a first configuration or a second configuration to the second computer, the infrastructure including implementing a forwarder module, a crypto module and a key control module;
   receiving a key trigger from the first computer;
   generating and storing a key by the key control module based upon receiving the key trigger from the first computer;
   responsive to deploying the infrastructure in the first configuration,
      receiving, by the forwarder module, the data from the first computer and identifying a data portion of the data for encryption,
      encrypting, by the crypto module, the data portion with the key,
      forwarding, by the forwarder module, the encrypted data portion to the application,
      reading, by the forwarder module, an encrypted data portion from the application for decryption,
      decrypting, by the crypto module, the encrypted data portion with the key, and
      forwarding, by the forwarder module, the decrypted data portion to the first computer;
   responsive to deploying the infrastructure in the second configuration,
      receiving, by the forwarder module, the data from the application and identifying the data portion of the data for encryption,
      encrypting, by the crypto module, the data portion with the key,
      forwarding, by the forwarder module, the encrypted data portion to the data-storage structure,
      reading, by the forwarder module, an encrypted data portion from the data-storage structure for decryption,
      decrypting, by the crypto module, the encrypted data portion with the key, and
      forwarding, by the forwarder module, the decrypted data portion to the application.

2. The computer-implemented method according to claim 1, wherein deploying the infrastructure comprises deploying code to the second computer that is imported from a source external to the second computer to implement the forwarder module, the crypto module and the key control module for execution by a processor of the second computer.

3. The computer-implemented method according to claim 1, wherein the deploying comprises at least one of:
   providing a self-extracting file containing code and opening the file to make the code available to the second computer,
   installing a web archive into a servlet-engine or into a web-application server,
   using a virtual machine image that performs the functions of the forwarder module, the crypto module and the key control module, and
   using the virtual machine image as a software-as-a-service offering on the second computer.

4. The computer-implemented method according to claim 1, wherein the key trigger is associated with a particular key-use-definition, and wherein generating and storing the key includes generating and storing the key by the key control module as a key for the particular key-use-definition.

5. The computer-implemented method according to claim 4, further comprising storing the data, wherein storing the data comprises:
   by the forwarder module, receiving the data and identifying the data portion to be encrypted;
   by the crypto module, retrieving the key from the key control module according to the particular key-use-definition that defines a particular portion of the data to be encrypted;
   by the crypto module, encrypting the data portion with the key to the encrypted data portion; and
   by the forwarder module, forwarding the encrypted data portion to the application responsive to deploying the infrastructure in the first configuration or forwarding the encrypted data portion to the data-storage structure responsive to deploying the infrastructure in the second configuration.

6. The computer-implemented method according to claim 5, further comprising retrieving the data, wherein retrieving the data comprises:
   by the forwarder module, reading the encrypted data portion from the application or from the data-storage structure;
   by the crypto module, retrieving the key from the key control module according to the particular key-use-definition;
   by the crypto module, decrypting the encrypted data portion with the key to the decrypted data portion; and
   by the forwarder module, forwarding the decrypted data portion to the first computer responsive to deploying the infrastructure in the first configuration or forwarding the decrypted data to the application responsive to deploying the infrastructure in the second configuration.

7. The computer-implemented method according to claim 6, wherein storing the data further comprises processing an unencrypted data portion of the data by the forwarder module and bypassing the unencrypted data portion of the data around the crypto module.

8. The computer-implemented method according to claim 7, wherein storing the data is performed for the data-storage structure being a database or being a file system.

9. The computer-implemented method according to 8, wherein deploying the infrastructure to the second computer comprises:
   combining two modules to provide for minimized inter-module communication, and wherein in a first option the forwarder module is combined to the crypto module and wherein in a second option the crypto module is combined to the key control module.

10. The computer-implemented method according to claim 8, wherein deploying the infrastructure to the second computer comprises deploying the infrastructure as a plug-in for the application or as a plug-in for the data-storage structure.

11. The computer-implemented method according to claim 1, wherein deploying the infrastructure comprises deploying a modified infrastructure with a gateway configured to encrypt and to decrypt data packages for the communication between the first computer and the second computer, the crypto module further configured to encrypt data packages leaving the first computer for the second computer and to decrypt data packages arriving at the second computer from the first computer, wherein the key that is provided is the same key used to encrypt the data portion and to decrypt the encrypted data portion.

12. A server computer, comprising:
a processor that is configured to execute code to implement a forwarder module, a crypto module and a key control module;
a data-storage structure for storing data;
a gateway to establish a communication connection with a client computer;
an application that processes data originating from the client computer and that provides processed data to be stored in the data-structure;
an infrastructure having two configurations and configured to be deployed in a first configuration or a second configuration, the infrastructure including:
the forwarder module
that in the first configuration is configured to receive data from the client computer and configured to identify a data portion for encryption, the forwarder module being configured to read an encrypted data portion from the application for decryption,
that in the second configuration is configured to receive processed data from the application and configured to identify a data portion for encryption, the forwarder module being configured to read an encrypted data portion from the data-storage structure for decryption,
the crypto module configured to encrypt the data portion with a key and configured to decrypt the encrypted data portion with the key, and
the key control module configured to generate and to store the key; and
a key channel that is configured to communicate a key trigger into the key control module when the key trigger is received from the client computer.

13. The server computer according to claim 12, wherein the code executed by the processor is imported from a source external to the server and the server is configured to execute the code imported from the source external to the server to implement the forwarder module, the crypto module and the key control module.

14. The server computer according to claim 12, wherein the key channel receives the key trigger being associated with a particular key-use-definition of the client computer and wherein the key control module generates and stores the key as a key for the particular key-use-definition.

15. The server computer according to claim 14, wherein the gateway is configured to encrypt and to decrypt data packages for the communication between the client computer and the server computer, the crypto module further configured to encrypt data packages leaving the server computer for the client computer and to decrypt data packages arriving at the server computer from the client computer, wherein the key that is provided is the same key used to encrypt the data portion and to decrypt the encrypted data portion.

16. A computer program product that, when loaded into a non-transitory memory of a second computer and being executed by at least one processor of the second computer, performs a computer-implemented method for configuring the second computer to store data in a data-storage structure, wherein the data originates from a first computer that is communicatively connected to the second computer, and wherein the data is processed by an application in the second computer, the computer program product comprising code that, when executed by the at least one processor, implements a forwarder module, a crypto module and a key control module and further comprising instructions, that when executed, cause the at least one processor to:
deploy an infrastructure to the second computer, the infrastructure having two configurations and configured to be deployed in a first configuration and a second configuration;
receive a key trigger from the first computer;
generate and store a key by the key control module based upon receiving the key trigger from the first computer;
responsive to deploying the infrastructure in the first configuration,
receive, by the forwarder module, the data from the first computer and identify, by the forwarder module, a data portion of the received data for encryption,
encrypt, by the crypto module, the data portion with the key,
forward, by the forwarder module, the encrypted data portion to the application,
read, by the forwarder module, an encrypted data portion from the application for decryption,
decrypt, by the crypto module, the encrypted data portion with the key, and
forward, by the forwarder module, the decrypted data portion to the first computer;
responsive to deploying the infrastructure in the second configuration, receive, by the forwarder module, the data from the application and identify, by the forwarder module, a data portion of the received data for encryption,
encrypt, by the crypto module, the data portion with the key,
forward, by the forwarder module, the encrypted data portion to the data-storage structure,
read, by the forwarder module, an encrypted data portion from the data-storage structure for decryption,
decrypt, by the crypto module, the encrypted data portion with the key, and
forward, by the forwarder module, the decrypted data portion to the application.

17. The computer program product according to claim 16 wherein code is imported from a source external to the second computer that, when executed by the at least one processor, implements the forwarder module, the crypto module and the key control module.

18. The computer program product according to claim 16 that performs the computer-implemented method, wherein the instructions for providing the key are performed for the key trigger being associated with a particular key-use-definition, and wherein the key control module generates and stores the key as a key for the particular key-use-definition.

19. The computer program product according to claim 18 further comprising instructions for storing data including instructions that, when executed, cause the at least one processor to:
- by the forwarder module, receive the data and identify the data portion to be encrypted;
- by the crypto module, retrieve the key from the key control module according to the particular key-use-definition that defines the particular portion of the data to be encrypted;
- by the crypto module, encrypt the data portion with the key to the encrypted data portion; and
- by the forwarder module, forward the encrypted data portion to the application responsive to the infrastructure being deployed in the first configuration or forward the encrypted data portion to the data-storage structure responsive to the infrastructure being deployed in the second configuration.

20. The computer program product according to claim 19 further comprising instructions for retrieving data including instructions that, when executed, cause the at least one processor to:
- read the encrypted data portion from the application or from the data-storage structure, by the forwarder module;
- retrieve the key from the key control module according to the particular key-use-definition, by the crypto module;
- decrypt the encrypted data portion with the key to the decrypted data portion, by the crypto module; and
- forward the decrypted data portion to the first computer responsive to the infrastructure being deployed in the first configuration or forward he decrypted data portion to the application responsive to the infrastructure being deployed in the second configuration, by the forwarder module.

* * * * *